Patented July 30, 1935

2,009,522

UNITED STATES PATENT OFFICE 2,009,522

EXTRACTION OF SUGAR CANE WAX

Miguel A. Rosales, Bais Oriental Negros, Philippine Islands

No Drawing. Application October 14, 1931, Serial No. 568,885

5 Claims. (Cl. 87—19)

This invention relates to the extraction of sugar cane wax.

It has been known for a long time that waxy substances are produced by sugar cane. This material, known variously as sugar cane wax, cerosin, cerosie, occurs on the rind of sugar cane. It occurs most abundantly near the nodes of the cane.

In the past many proposals for removing this wax from the cane have been made. These consist either of mechanical removal of the wax from the cane by scraping or extraction of this wax from the bagasse. Recently it has been proposed to extract the wax from the wet filter cake or residue resulting from the defecation and filtration of the raw cane juices.

An object of the present invention is to provide a new process of extracting sugar cane waxes.

Yet another object is to provide a method of extracting sugar cane wax which is effective and economical.

Yet a further object is to provide a process for the extraction of sugar cane wax whereby by-products of the sugar cane are utilized in the extraction.

With these and other equally important objects in view, the invention resides, inter alia, in the concept of extracting the wax from the filter cake after the latter has been reduced to a dry condition, and then submitting this dry or substantially dry cake to the action of an improved solvent to extract the wax.

This sugar cane wax is a dull yellow hard material which can be powdered. It is substantially insoluble in cold water, cold alcohol and cold ether, but soluble to varying extents in hot alcohol and hot ether; boiling alcohol dissolves it entirely.

As a result of experimentation in this field, I have found that the filter cake residues obtained from the commercial varieties of cane sugar contain usually from 12 to 20% of extractable matter or wax (in terms of moisture free material). These experiments have also proved that a large proportion of these waxes or fat-like substances do not remain in the bagasse but pass into the juice and through the mills with the imbibition water, and are largely entrained or separated out in the filter cake.

I have found furthermore that by reducing this residue or filter cake to a substantially dry condition, an effective, rapid and almost quantitative recovery of the wax may be had. In accordance with the new process, therefore, the press-cake residue should be dried as completely as possible in a suitable drier. While the extraction of the wax is facilitated by reducing the press-cake to a substantially dry condition, improved results may be obtained by eliminating a large percentage of the water but without completely drying the material. This drying of the press-cake residue may be carried out in any suitable apparatus, such as a rotary dryer operated at atmospheric or subatmospheric pressures. The drying temperature should be carefully regulated so as not to deleteriously affect the wax. After drying, in any suitable apparatus, the material is then preferably charged to a steam jacketed extractor, preferably fitted with agitating apparatus, decanting cocks and straining boxes, and connected with a vacuum pump.

To the dried or substantially dry residue in the extractor is added a special solvent. As noted above, this wax-like material is not entirely soluble in many of the generally known commercial solvents and the choice of a suitable solvent is important in the extraction process. I have found that very effective solution or extraction of the wax may be had by utilizing as a solvent approximately 100 parts by volume of ethyl alcohol, of any desired proof, substantially 10 parts of sulfuric ether and about 2 parts of methyl alcohol. It is to be understood that this composition is not absolute but may be varied within reasonable ranges. This solvent is very effective for extracting the wax when utilizing cold solution, but improved extraction may be had by utilizing a solvent in the heated condition. It will be noted at this point that the major component of the solvent, namely ethyl alcohol, constitutes a by-product of the process of extraction and recovery of sucrose from sugar cane and is obtained by the fermentation and distillation of molasses, a sugar by-product.

The mixture of the special solvent and the substantially water-free press-cake is agitated in the extractor for a period of time sufficient to bring all of the wax into solution. During this extraction process optimum temperature conditions may be obtained by coursing steam through a closed coil positioned within the extractor.

After complete or substantially complete extraction is had the material is drawn or decanted from the extractor and is allowed to settle in suitable settling tanks, preferably fitted with conical bottoms. In this element undesired fines and residues settle out and may be returned to the extractor for retreatment with the next batch.

The supernatant liquid, which comprises the wax in solution in the solvent, may then be distilled in a suitable steam jacketed vessel to drive off the volatile solvent which is condensed and recovered by passing the solvent vapors through the reflux, or any other suitable type of condenser. Either in the same still or a different one, final traces of the solvent may be expelled by direct distillation with steam. The solvent-free wax may then be discharged into another vessel where further refining treatments may be employed to obtain the wax in any desired state of purity.

As a variant in the process, the press-mud recovered from the extractor may be heated in a vessel provided either with the closed steam coil or with open steam coils to distill off the residual traces of solvent. This solvent is then condensed in any suitable apparatus and returned to the solvent storage tank. Final traces of the solvent may be removed from the residue or mud by injecting direct steam. These steps of recovering the solvent may be speeded up by suitably agitating the heavy residues. In the preferred form of the process the solvent recovered by distillation with indirect heat is segregated from that obtained by steam distillation so as to maintain the alcoholic strength of the solvent mixture.

It is found that by this method of extracting the wax from the dried filter cake and by utilizing a special solvent, a maximum recovery of the wax content of the sugar cane may be achieved. It is found, furthermore, that this treatment involving the preliminary drying step presents other advantages. While making no attempt to define the reasons for these, it may be that the preliminary treatment involving the drying of the material tends to decompose or otherwise eliminate some of the fatty matters included with the wax in the raw product. Whatever the cause may be, it is found as an actual fact that effective and large percentage extraction of the wax content may be achieved by this novel process.

While a preferred method of recovering sugar cane wax has been described, it is to be understood that this is given merely as exemplifying the principles of the invention which are conceived to reside broadly in the concept of extracting the wax from a dry or substantially dry press-cake with a suitable solvent, and preferably with the improved solvent. The invention, therefore, is not intended to be limited to the process described, except as such limitations are clearly imposed by the appended claims.

I claim:

1. A method of recovering waxy bodies from sugar cane which comprises expressing the juice from the cane, filtering the juices, to recover a clarified liquid and a moist residue, reducing the moisture content of the residue by heat alone and without alkali digestion and then subjecting the residue to the action of a material having a solvent action on the waxy bodies.

2. A method of recovering waxy bodies from sugar cane which comprises expressing the juice from the cane, filtering the juices to obtain a liquid and a residue, drying the residue in a suitable drier and without the use of alkalies and extracting the dried residue with a solvent largely comprising ethyl alcohol.

3. A method of recovering waxy bodies which comprises filtering the sugar juices, drying the residues in a centrifugal or indirect dryer, agitating the dried residues without any preliminary digestion with alkali with a solvent, comprising a mixture of ethyl alcohol, sulphuric ether and methyl alcohol, to extract the waxes and then volatilizing and recovering the solvent free from the waxy bodies, and then purifying the said bodies.

4. A method of recovering sugar cane waxes which comprises drying the defecates of the sugar cane juice, agitating the dried material with a solvent, comprising a mixture of a predominant quantity of alcohol and minor quantities of sulphuric ether and methyl alcohol, to extract the waxy matters, separating the solvent from the residues, retreating the residue with additional solvent, then distilling off the solvent and recovering the wax.

5. A method of recovering waxy bodies from sugar cane which comprises filtering the sugar juices, drying the residue by heating such residue without the addition of any reagent, agitating the dried material with a hot solvent which comprises a mixture of ethyl alcohol, sulphuric ether and methyl alcohol to extract the waxes, and then separating the solvent from the wax.

M. A. ROSALES.